H. GEYER.
DEVICE FOR CUTTING SLITS IN BRICK WALLS.
APPLICATION FILED AUG. 27, 1908.
984,132.
Patented Feb. 14, 1911.
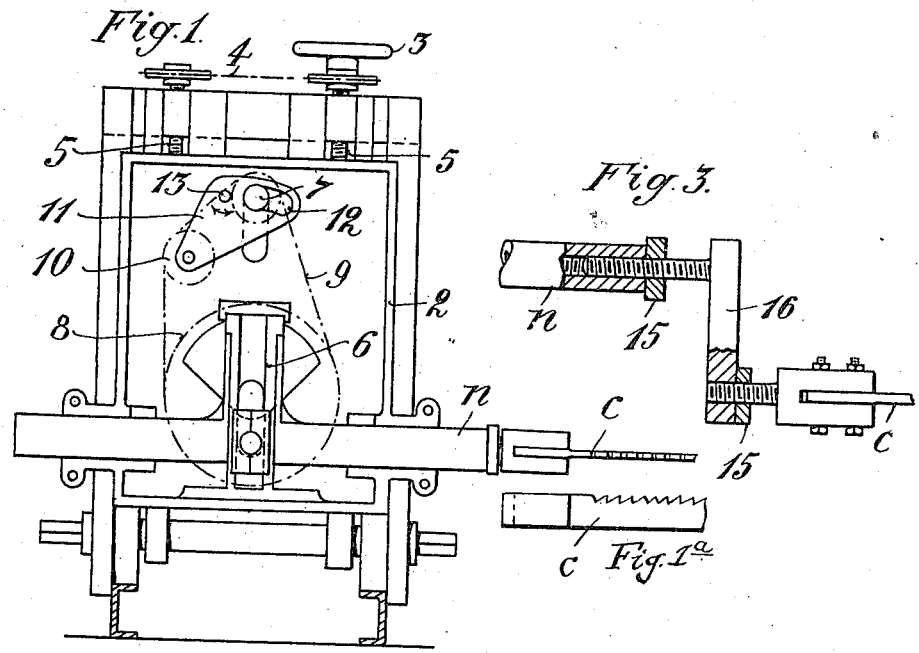
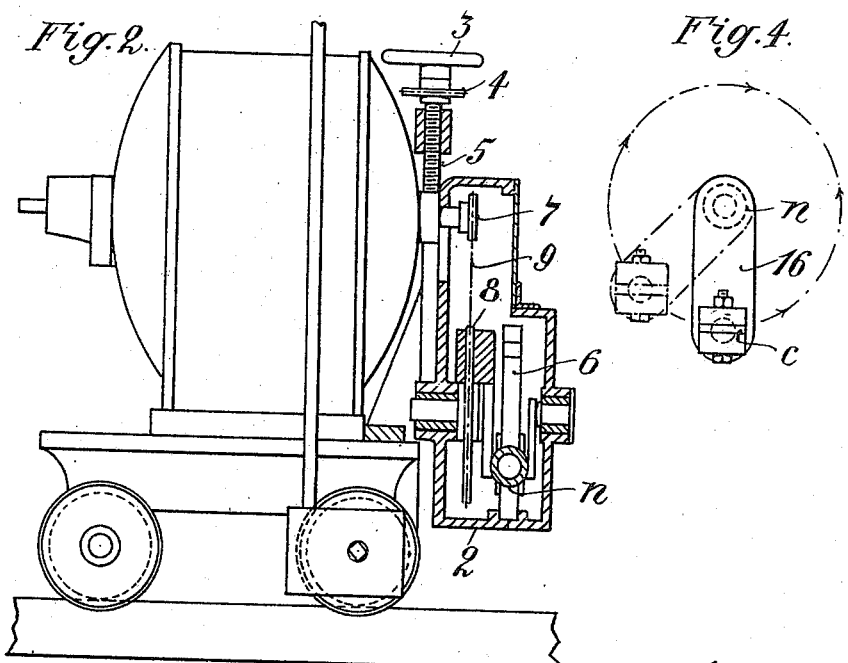

UNITED STATES PATENT OFFICE.

HANS GEYER, OF MUNICH, GERMANY.

DEVICE FOR CUTTING SLITS IN BRICK WALLS.

984,132.      Specification of Letters Patent.      Patented Feb. 14, 1911.

Application filed August 27, 1908. Serial No. 450,483.

*To all whom it may concern:*

Be it known that I, HANS GEYER, citizen of Germany, residing at Munich, Bavaria, Germany, have invented certain new and useful Improvements in Devices for Cutting Slits in Brick Walls; and I do hereby declare the following to be a full, clear, and exact description of the invention, such as will enable others skilled in the art to which it appertains to make and use the same.

The present invention relates to an improvement in the already known device for cutting slits in brick walls for the purpose of insulating these latter against dampness by inserting insulating plates in said slits.

This device, as heretofore known, consisted of a boring device and a saw blade, which are mounted together with the driving motor on a frame, which latter is suitably adjustable on a car running on rails. The improvement according to the present invention provides for the vertical adjustment of the saw during the working of the machine. This vertical adjustment during the action of the saw is necessary whenever the layers of mortar in the wall are not perfectly horizontal or when the rails for the car cannot be arranged parallel to said layers.

Reference being had to the accompanying drawings, Figure 1 is a front view of the device, Fig. 1ᵃ a detail plan view, Fig. 2 a side view showing certain parts in section, and Figs. 3 and 4 are a detail side view in part section and a detail front view respectively of a modification.

The saw and its gearing, the latter consisting of means for imparting a reciprocating motion to the saw, are mounted in a sliding carriage 2, which can be raised and lowered by means of two screw spindles, 5, 5, actuated by the hand-wheel 3 and chain gear 4. The reciprocating guide bar of the saw $c$, in this instance consisting of a tubular rod $n$, is actuated by a sliding crank movement 6, through the endless chain 9, passing over the chain wheel 8 and a driving wheel mounted on the driving shaft 7.

In order to keep the endless chain 9 stretched, and therefore in engagement with the abovementioned chain wheels when the sliding carriage 2 is vertically adjusted, a further chain wheel 10 (Fig. 1) is provided, arranged on a piece 11, pivoted to the carriage 2 at 13, and having a slot 12 to receive the end of the shaft 7. If now the carriage 2 is raised, the pivot 13 of the piece 11 will also be raised and the shaft 7 in the slot 12, remaining relatively stationary, will cause the wheel 10 to be pushed outward, thereby stretching the chain. When the carriage 2 is lowered, wheel 10 will in similar manner be moved inward. By means of this contrivance the chain will always be kept stretched without any special manipulation being necessary for this purpose.

Figs. 3 and 4 show a modification with the help of which also a convenient vertical adjustment of the saw is possible. This improvement consists in the arrangement of a crank-like piece 16 between the reciprocating rod $n$ and the saw blade $c$. By turning this piece 16 about the rod $n$ as a center, a vertical adjustability of the saw blade equal to the diameter of the circle described by the crank piece 16 is attained, without altering the height of the reciprocating rod $n$. This crank piece 16 screws into the head of the rod $n$ and is fixed into position by means of a lock nut 15. The holder of the saw blade $c$ is attached to the piece 16 in a similar manner, by means of a screw bolt and lock nut.

What I claim as my invention and desire to secure by Letters Patent, is:

1. In a machine for cutting horizontal slits, the combination, of a horizontally movable car, a motor fixed thereon, a reciprocating rod driven by the motor, a saw mounted on the rod to cut horizontally, means to adjust the position of the rod vertically, a driving belt connection between the motor and rod, and means to automatically maintain the belt taut at all adjusted positions of the rod.

2. In a machine for cutting horizontal slits, the combination, of a horizontally movable car, a motor fixed thereon, a reciprocating rod driven by the motor, a saw mounted on the rod to cut horizontally, means to adjust the position of the rod vertically, a drive pulley fixed to the car, a driven pulley adjustable with the rod, a belt connecting the two pulleys, and means to automatically maintain the belt taut at all adjusted positions of the rod and driven pulley, and comprising a lever pivoted on a part adjustable with the driven pulley, an idler pulley carried by one arm of the lever and bearing on the belt, and a fixed abutment for the other arm of the lever.

3. In a machine for the purpose set forth, the combination, of a supporting frame, a carriage adjustable vertically on said frame, a drive pulley mounted on the frame, a driven pulley mounted on the carriage, a rod mounted to reciprocate on the frame, a tool carried by the rod, a belt connecting the two pulleys, means to adjust the carriage vertically, and means to automatically maintain the belt taut at all adjusted positions of the driven pulley and comprising a lever pivoted on the carriage with one arm bearing on a fixed abutment, and an idler carried by the other arm of the lever and bearing on the belt.

4. In a machine for the purpose set forth, the combination of a supporting frame, a carriage adjustable vertically on the said frame, a driving shaft having one end projecting through the frame, a saw on the carriage, a chain and sprocket gearing between the driving shaft and the saw, a lever pivoted on the carriage and having a slot at one end engaging the driving shaft, and an idler at the opposite end of the lever bearing against the chain.

5. In a machine for the purpose set forth, the combination, of a supporting frame, a carriage adjustable vertically on said frame, a drive pulley mounted on the frame, a driven pulley mounted on the carriage, a crank arm carried by the driven pulley, a slotted guide block mounted on the crank arm, a rod mounted to reciprocate on the frame on the guide block, a tool carried by the rod, a belt connecting the two pulleys, means to adjust the carriage vertically, and means to automatically maintain the belt taut at all adjusted positions of the driven pulley and comprising a lever pivoted on the carriage with one slotted arm engaging an abutment projecting from the frame, and an idler carried by the other arm of the lever and bearing on the belt.

6. In a machine for cutting horizontal slits, the combination, of a horizontally movable car, a motor fixed thereon, a reciprocating rod driven by the motor, means to adjust the position of the rod vertically, a drive pulley fixed to the car, a driven pulley adjustable with the rod, a belt connecting the two pulleys, means to automatically maintain the belt taut at all adjusted positions of the rod and driven pulley and comprising a lever pivoted on a part adjustable with the driven pulley, an idler pulley carried by one arm of the lever and bearing on the belt, a fixed abutment for the other arm of the lever, a radial arm rotatably mounted on the end of the rod, and a saw carried by the end of the arm.

7. In a machine for the purpose set forth, the combination, of a supporting frame, a carriage adjustable vertically on said frame, a drive pulley mounted on the frame, a driven pulley mounted on the carriage, a crank arm carried by the driven pulley, a slotted guide block mounted on the crank arm, a rod mounted to reciprocate on the frame on the guide block, a belt connecting the two pulleys, means to adjust the carriage vertically, means to automatically maintain the belt taut at all adjusted positions of the driven pulley and comprising a lever pivoted on the carriage with one slotted arm engaging an abutment projecting from the frame, an idler carried by the other arm of the lever and bearing on the belt, a radial arm rotatably mounted on the end of the rod, and a saw carried by the end of the arm.

In testimony whereof I hereunto affix my signature in the presence of two witnesses.

HANS GEYER.

Witnesses:
LOUIS MUELLER,
MATHILDE K. HELD.